INVENTOR.
ERNEST V. BUNTING
ATTORNEYS

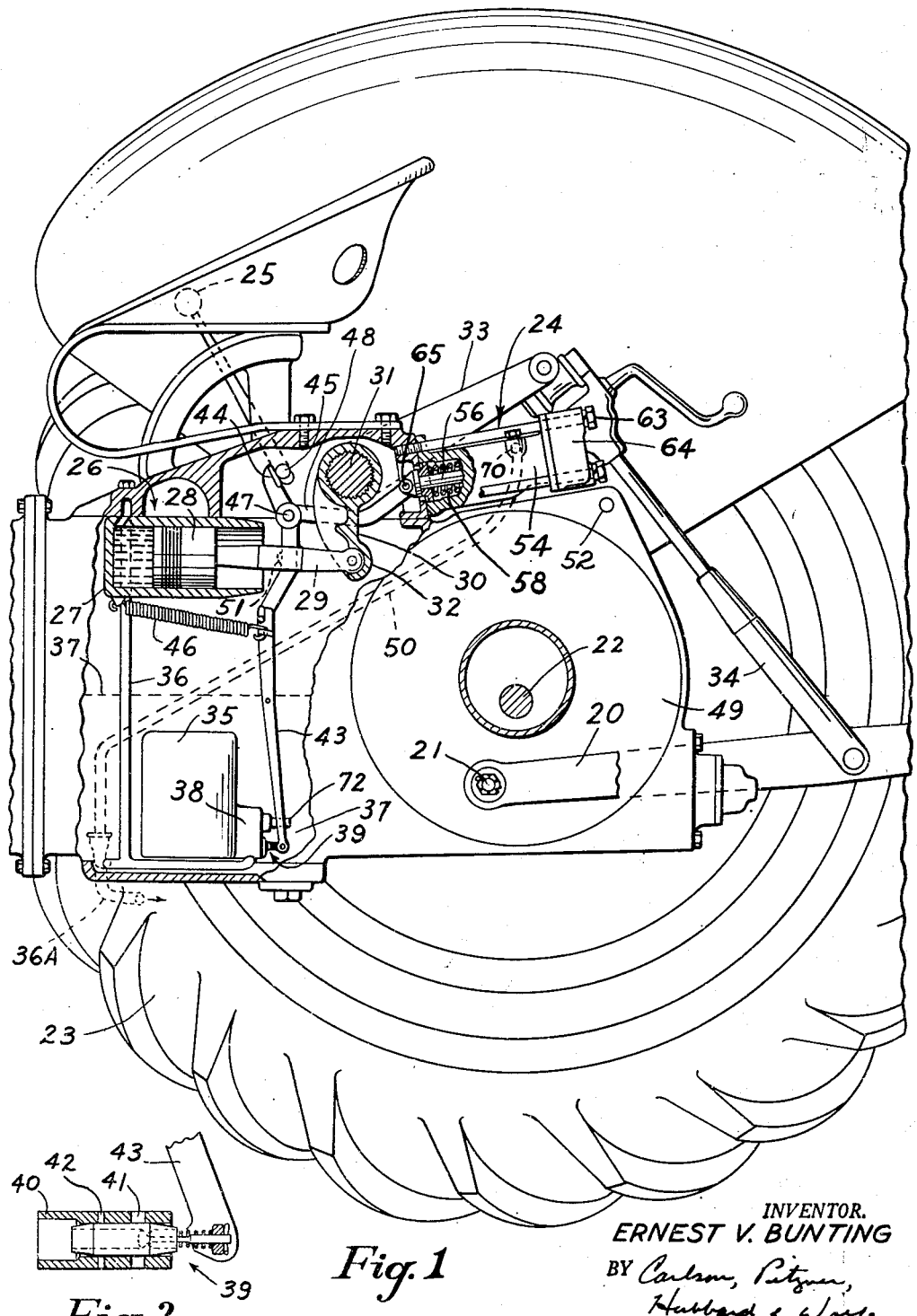

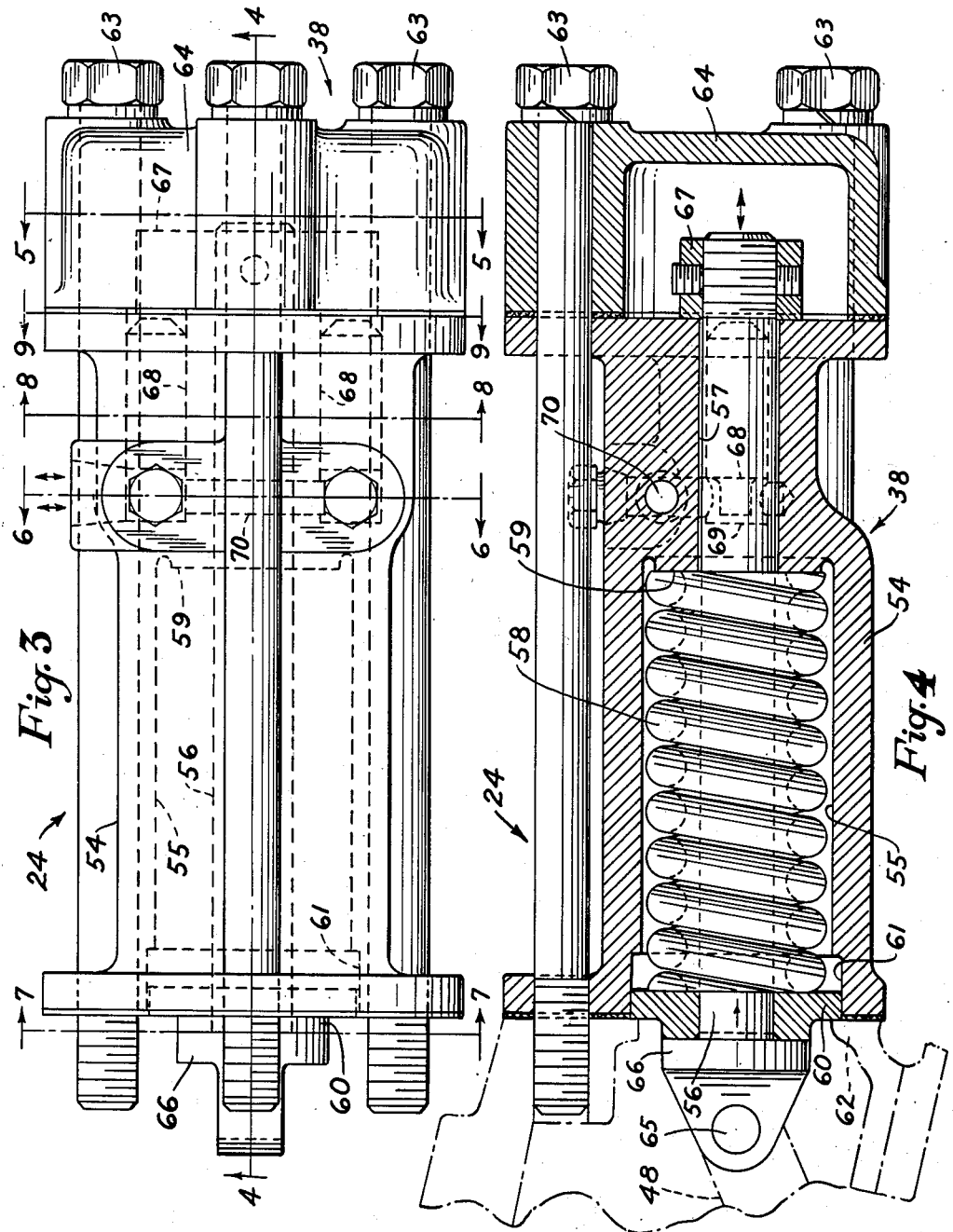

Patented Feb. 10, 1953

2,627,796

UNITED STATES PATENT OFFICE 2,627,796

CONTROLLABLE LOAD TRANSFER HITCH FOR TRACTORS

Ernest V. Bunting, Dearborn, Mich., assignor to Harry Ferguson, Inc., Detroit, Mich., a corporation of Delaware Application January 2, 1948, Serial No. 225

10 Claims. (Cl. 97—50)

1

The present invention pertains to hydraulically operated hitch mechanisms for tractors, the general aim being to provide such a hitch which is capable of accomplishing in a novel and improved manner a controlled transfer of weight to the tractor from an implement or other trailed device coupled by the hitch.

The objectives here will be more readily apprehended if, by way of preliminary, consideration is given to the contrast of the presently disclosed system with current and familiar automatic draft control systems. Typical of the latter is that disclosed in U. S. Patent No. 2,118,180 to Henry George Ferguson. In the draft control system of the latter patent a hitch linkage on the rear of the tractor is swung vertically by a hydraulic lift unit, powered from the tractor engine. Ground reaction or draft load on the implement tends to heel it forwardly about its pivotal connection to the hitch and such tendency is transmitted mechanically through the hitch linkage to a control element for the power unit. The latter unit is caused automatically to raise or lower the hitch and its attached implement, as may be required to retain the draft load constant. The hitch linkage itself is, moreover, of such geometry that at least a portion of the downward forces acting on the implement are transferred to the rear end of the tractor for augmenting the tractive effort of its rear drive wheels. But the primary control criterion of an automatic draft control system is constancy of draft load on the tractor. In contrast, the objective of the present invention is to make, not constancy of draft load, but instead constancy of transferred load the criterion of control.

In an automatic draft control system the draft load which is retained constant is comprised of a major horizontal component of force and a smaller vertical component of force. In a constant transfer system such as here contemplated, on the other hand, the transferred load which is automatically retained constant is comprised solely of a vertically acting force or forces.

By retaining constant the transferred load, as here contemplated, a whole new field of control is opened up as compared to automatic draft control. A great variety of implements can be controlled in manners not heretofore possible. Simply by way of example, take the case of tractor-trailed row planters supported on press wheels. These press wheels serve to firm or press the soil down over the newly planted seed. By using a transfer controlling hitch such as here disclosed the amount of weight borrowed

2 from the planter by the tractor can be regulated with nicety, thereby leaving an equally well controlled increment of implement weight remaining to act downward on the press wheels for firming the seed bed. The pressure on the seed bed can thus be made as gentle or as vigorous as may be required for any particular soil and seed conditions that are encountered.

A mowing machine trailed from a tractor on a ground shoe or skid is another example. In such an implement it is desirable that only a limited amount of its weight be applied to the ground shoe. With the present system, the remaining weight, in controlled amount, can be transferred.

On the other hand, with some heavy trailers or implements safe operation with a light tractor makes it desirable to place a positive limit on the weight transferred to the tractor. Borrowing of weight to the tractor rear end for increasing traction is all very well but it can under some instances of heavy implement weight become excessive. With the present system such borrowing can be automatically limited to any desired value.

Another benefit of the presently disclosed apparatus is that pressure fluid is made available at carefully controlled pressure for use in operating auxiliary hydraulic devices. The latter may be used, for example, in adjusting some implement element. Fluid pressure conditions in an automatic draft control system are, in contrast, inherently such that direct supply of fluid from it to auxiliaries is difficult to control.

Still another object is to provide a substantially self-contained conversion unit of reasonable structural simplicity which can be applied with but little skill or direction to existing tractor draft load systems to convert them to constant transfer systems such as here contemplated.

Further objects and advantages of the invention will become apparent as the following description proceeds, taken in connection with the accompanying drawings, in which:

Figure 1 is a side elevation of the rear portion of a tractor equipped with a constant transfer hitch mechanism of the present invention, the near rear wheel and fender of the tractor being removed and certain of the parts being broken away and others longitudinally sectioned to better show the interior arrangement of parts.

Fig. 2 is a detailed view on somewhat enlarged scale showing in longitudinal section the main control valve of the installation in Fig. 1.

Fig. 3 is a plan view on somewhat enlarged scale of a pressure responsive unit included in the installation of Fig. 1, the subject unit being shown in Fig. 1 as mounted above the tractor's differential housing.

Fig. 4 is a longitudinal sectional view through the unit of Fig. 3, the section being taken substantially along the line 4—4 in Fig. 3.

Figs. 5, 6, 7, 8 and 9 are transverse sectional views of the unit taken respectively substantially along the lines 5—5, 6—6, 7—7, 8—8 and 9—9 in Fig. 3.

Figure 5:
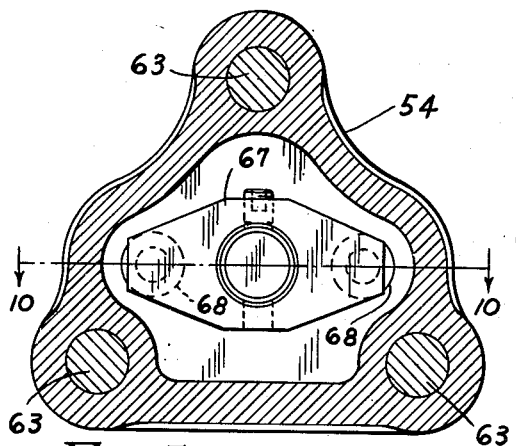
Figure 8:
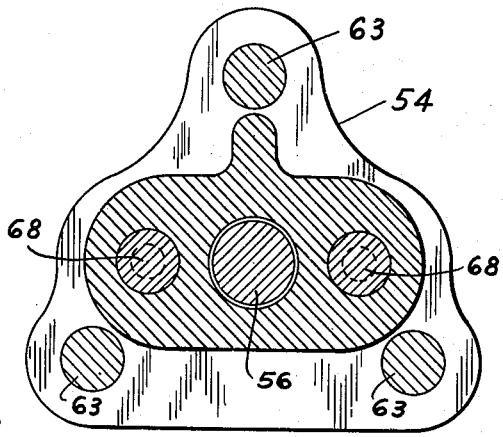
Figure 6:
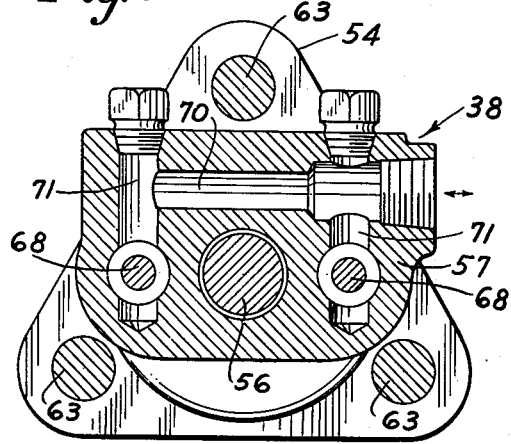
Figure 9:
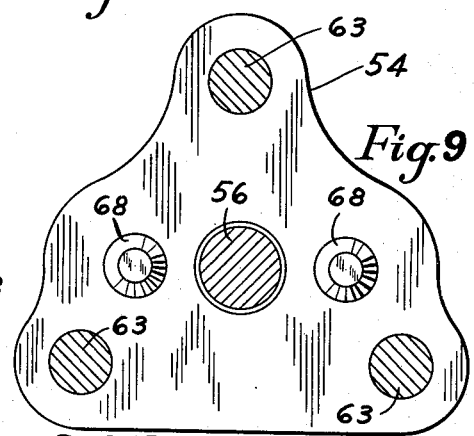
Figure 7:
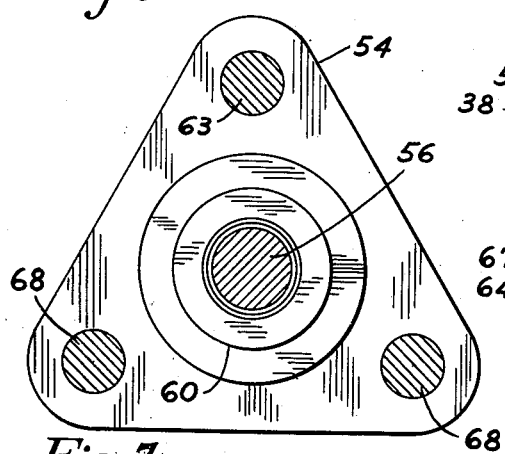
Figure 10:
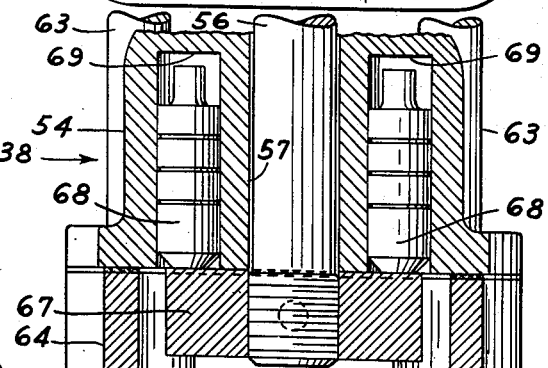

Fig. 10 is a longitudinal sectional view through the outer end of the unit, being taken substantially along the line 10—10 in Fig. 5.

Variants in individual components of the system disclosed will readily occur to skilled designers in this field. Accordingly, even though a particular embodiment and application of the invention have been shown and described in some detail, there is no intention to thereby limit the invention to such specific form or the particular employments here indicated. On the contrary, the intention is to cover all modifications and alternative arrangements falling within the spirit and scope of the present invention as expressed in the appended claims.

Referring more particularly to the illustrative embodiment of the invention shown (see Fig. 1), a pair of hitch links 20 are provided for attachment of an implement (not shown) and trail from the rear end of the tractor in laterally spaced relation. These hitch links 20 are pivoted on ball joints to swing vertically about their forward ends at points 21 located below and slightly forward of the tractor's rear axle 22. A hydraulic power lift, later described, is arranged to tug upward on these hitch links. So much of the implement weight or other downwardly acting load forces as are thus sustained on the upwardly urged hitch linkage are, accordingly, transferred to the rear end portion of the tractor via the linkage and hydraulic lift unit, holding the tractor's rear pneumatic-tired, rear traction wheels 23 down to their work.

It is with the control of such transfer that the present invention is concerned. To maintain a constant, downwardly acting transferred loading on the tractor, the mechanism here disclosed maintains constancy in the counter or upward thrust of the hydraulic lift. By maintaining the fluid pressure in such lift constant, the raising force exerted on the hitch linkage (and hence the opposing load which is transferred) is maintained constant.

For such purpose a constant pressure type of hydraulic system for supplying the hydraulic lift can be built into the tractor originally, or an existing hydraulic system on it converted to constant pressure operation. In the present instance a conversion job has been illustrated (Fig. 1) employing a conversion unit designated generally as 24. This unit coacts with a portion of what, even from the remnants appearing, will be recognized by those skilled in the art as a familiar commercial form of the automatic draft control system of Ferguson Patent No. 2,118,180 mentioned previously herein. Some portions of the latter system have, as will be noted, been removed to accommodate the new unit. Moreover, so completely have the functioning and operation been altered in the new combination that special care must be taken not to be misled as to the purpose and action of the elements even though their physical appearance be familiar.

For example, the quadrant lever 25 (Fig. 1) has long been familiar in automatic draft control systems like that identified above, being moved up or down to vary the depth of soil penetration of an implement and thus adjust the draft load. In the present setup, however, movement of that same hand lever 25 does nothing of the kind. Instead, its movement adjusts the value at which the fluid pressure is maintained in the hydraulic system.

Before proceeding with details of the conversion unit 24, identification will be made of those components of the old draft control system which remain on the tractor for incorporation in the new system. The quadrant lever 25 has already been noted. Also included is a main hydraulic actuator shown as a one-way ram 26 comprising a cylinder 27 receiving a slidable piston 28. A thrust link 29 connects this piston to a depending crank arm 30 fixed to a transverse rockshaft 31, the rounded outer end of the thrust link being received in a socket 32 in the lower end of the arm 30. Also fixed to the rockshaft 31 is a pair of upwardly and rearwardly projecting crank arms 33 having their outer ends connected by drop links 34 with respective ones of the hitch links 20.

Pressure fluid, such as oil, is supplied to the ram 26 from a pump 35 by way of a conduit 36. A reserve supply of oil is maintained in a sump at 37 formed by the portion of the tractor casing receiving the pump. A main control valve mechanism 38 is located on the intake side of the pump.

The valve mechanism 38 (see Fig. 2) includes in this instance an axially slidable valve plunger 39 received in a bushing or sleeve 40 having in it at axially spaced points a set of intake or supply ports 41 and exhaust ports 42. The pump 35 is powered from the tractor engine (not shown) and operates continuously. When the valve plunger 39 is moved to uncover the supply ports 41 the pump delivers additional fluid to the system through the conduit 36. On the other hand, when the valve plunger is shifted to uncover the restricted bleed ports 42 it connects the conduit 36 to drain, permitting fluid to return to the sump and relieving the pressure in the system. When the valve plunger 39 is in its mid or neutral position shown in Fig. 2, both the supply and exhaust ports are blocked so that the fluid is retained in the system.

Motion is imparted to the valve plunger 39 by mechanical linkage, including a generally upright floating lever 43 pivotally connected to the valve plunger at its lower end. The upper portion of the floating lever 43 is divided to straddle the ram 26 and has on its upper end a pad 44 arranged to bear against an eccentric 45 on the quadrant lever 25. A contractile spring 46 yieldably urges the floating lever 43 to rock clockwise and thus retain the pad 44 in contact with the eccentric 45. Pivoted to the floating lever 43 intermediate its ends at 47 is a rearwardly extending connecting member or yoke 48.

Those familiar with the draft control system of Ferguson Patent No. 2,118,180 previously mentioned, will appreciate that the yoke 48 or corresponding part in such system is normally connected at its rear end to a spring biased, axially slidable control rod normally mounted above the tractor's differential housing 49 and connected at its outer end to a shackle rockably mounted at 52 and to which the usual upper hitch link may be connected. In the present instance the biasing or control spring for the control rod and the shackle are not shown, the same having been removed to make way for the conversion unit 24 which is now located on the upper side of the differential housing. Where an implement requiring an upper link attachment is to be used with the pressure control system, an attachment for such a link to the tractor similar to that shown in said patent may be employed.

So much for the elements of the old constant draft system which have been left on the tractor for utilization in the new constant transfer system. To integrate the elements so far described for constant transfer or constant pressure operation, the conversion unit 24 is employed. This unit responds to the fluid pressure prevailing in the system and serves, in general, to correctively retain that pressure constant at a preselected value by automatically rocking the floating lever 43 either to effect pumping of more fluid or relief of pressure, all as may be required to restore the preset pressure value in the system. Pressure from the system is applied to the unit 24 by way of a conduit 50 (Fig. 1) connected to the line 36 between the pump discharge port and the ram cylinder 27.

In its preferred form illustrated (see Figs. 3 and 4 in addition to Fig. 1) the unit 24 comprises an elongated cast metal body 54 having in it a cylindrical chamber 55 opening to its inner end. Extending through the center of this chamber 55 and through a communicating axial bore 57 is a plunger or rod 56. This plunger 56 extends entirely through, and projects beyond both ends of, the body 54. Encircling the portion of the rod 56 within the chamber 55 is a helical compression spring 58. The inner end of the spring bears against a shoulder 59 on the housing while its outer end bears against a washer 60 slidably received in the enlarged outer end portion 61 of the chamber 55. A border flange 62 extending circumferentially about an opening in the wall of the tractor casing to which the unit 24 is attached limits movement of the washer 60 under thrust of the spring 58. Bolts 63 detachably secure the unit housing 54 to the tractor and also retain in place a cup shaped housing 64 on the outer end of the housing 54.

The inner end of the plunger 56 (Figs. 1 and 4) has a head 66 which is pivotally connected at 65 with the fork 48 previously identified. The head 66 abuts against the outer face of the washer 60. Thrust is thus transmitted from the spring 58 to the plunger 56 via the washer 60 and head 66. On the other or outer end of the plunger 56 is rigidly fixed a transverse block or cross-head 67 arranged to overlie the exposed noses of a pair of pistons or plungers 68 (Fig. 10). Such plungers are slidably received in cylinder bores 69 formed in the housing 54 in parallelism with the central bore 57 and lying on opposite sides of it.

Pressure fluid from the line 50 enters a transverse passage 70 (Fig. 6) in the housing 54 and thence flows through branch passages 71 into respective ones of the cylinder bores 69. Pressure fluid from the discharge side of the pump in the hydraulic system is thus supplied to the cylinder bores 69 and tends to urge the plungers 68 outward. As the plungers 68 move outward, they draw the plunger 56 outward with them against the yielding resistance of the spring 58. Axial displacement of the plunger 56 is thus proportional to the fluid pressure applied to the plungers 68 or, in other words, to the pressure prevailing in the system. It is such displacement of the plunger 56 which is used to actuate the control valve mechanism 38 whenever the pressure departs from a desired value.

Having in mind the structure of the various component elements of the installation described above, consideration may now be given to the over-all operation. Let it be assumed first of all that the quadrant lever 25 (Fig. 1) is pushed downward to substantially its lowermost position. In such case the floating lever 43 will have been rocked counterclockwise from the position actually illustrated in Fig. 1, pulling the main valve plunger 39 rightward to uncover the bleed ports 42. Accordingly, the pump 35 will be running idly, pressure in the system will have been relieved to substantially zero and the fluid drained from the ram cylinder 27 so that the ram piston 28 is fully retracted within the cylinder and the hitch links 20 located in their lowermost position.

With some implement (not shown) attached to the hitch links 20, a desired portion of its otherwise ground supported weight can be transferred to the tractor's rear end simply by pulling the quadrant lever 25 upward. The extent to which the quadrant lever is moved upward determines the amount of load which will be transferred to the tractor. In other words, the quadrant lever position will determine the fluid pressure setting for the system.

Assuming the quadrant lever 25 to have been pulled upward from zero pressure position to the position shown in Fig. 1, the resultant motion of the eccentric 45 causes the floating lever 43 to rock clockwise about its pivot 47, closing the bleed ports 42 and opening the supply ports 41. Consequently, the pump 35 delivers pressure fluid to the system, to produce a pressure against the piston tending to raise the hitch links 20. With an implement of appropriate weight attached to the hitch links the result will be a progressively increasing fluid pressure in the system. As the fluid pressure rises the plungers 68 in the unit 24 are moved outward, displacing the plunger 56 axially in an outward direction. This displacement of the plunger 56 gradually rocks the floating lever 43 counterclockwise with the lever fulcruming about the eccentric 45. Finally, the floating lever is rocked far enough in this manner to pull the valve element 39 into neutral, blocking both the sets of ports 41 and 42. The system is thereby cut off or brought into equilibrium at some pressure less than that required to raise and wholly support the attached implement.

The fluid pressure prevailing in the system at "cut-off" is dependent upon the position of the quadrant lever 25. That such is the case will be observed upon reference to the relative movement of the parts. The location of the eccentric 45 (determined by the setting of the quadrant lever 25) determines the degree through which the plunger 56 must be displaced in order to rock the floating lever 43 sufficiently to move the valve plunger 39 into neutral. The axial displacement of the plunger 56 is, on the other hand, directly proportional to fluid pressure in the system. The higher the quadrant lever 25 is pulled, the farther to the right the eccentric 45 is shifted and consequently the plunger 56 must be moved proportionately farther to the right by a correspondingly higher pressure to bring the valve mechanism again to neutral. It will be perceived that shift of the fulcrum point eccentric 45 by the quadrant lever 25 thus changes the effective length of the mechanical connection between the pressure responsive unit's plunger 56 and the valve plunger 39. A scale (not shown) can, of course, be placed alongside the quadrant lever 25 and with the scale calibrated as desired as, for example, in terms of pressure or in terms of transferred load.

Once the system has been brought under pressure at some desired value as described above, the pump 35 ceases to deliver any further fluid since its intake ports 41 are closed. Consequently, even though the pump runs continuously there is no additional pumping of oil with attendant foaming and heating, both of which are deleterious. Nor is it necessary to resort to the complications of stroke change on the pump. Upon any departure of fluid pressure from the preset valve, however, the valve mechanism 38 will automatically be actuated to restore the preset pressure, either by the pumping of further fluid or by relief of pressure, as the case may be.

Thus in the event that there is an increase in fluid pressure above the preset value, the plunger 56 will be urged further to the right (Fig. 1) beyond the position which it occupied at cut-off, rocking the floating lever 43 counterclockwise about the eccentric 45 to pull the valve plunger 39 rightward and open the bleed ports 42. Relief of pressure will then ensue and as the pressure drops again the plunger 56 returns leftward to the position which it occupied at cut-off, swinging the floating lever 43 clockwise to restore the valve plunger 39 to neutral. Similarly, upon a drop in pressure below the preset value, the plunger 56 will move leftward under the urging of the spring 58, allowing the spring 46 to rock the floating lever 43 clockwise to uncover the pump's intake ports 41. Additional fluid is thereupon supplied to the system, quickly restoring it to the desired pressure and at which value it returns to equilibrium.

Should the operator at any time wish to change the amount of load transferred by the hitch, he has only to shift the quadrant lever 25. Such shift establishes a new "control point" for the system at which cut-off or equilibrium occurs in the same general manner described above. Thereafter, the newly established pressure is maintained automatically in the same manner previously described, until some new quadrant lever setting is effected.

The range of pressures available can be changed by substituting springs 58 of different strengths. It will be perceived that the more resistant this spring is made the greater will be the fluid pressure which must be applied against it to effect a given increment of travel for the plunger 56. Accordingly, the increase in fluid pressure established for any given increment of upward swing in the quadrant lever 25 is correspondingly increased. Normally, a size for the spring 58 is chosen such that the maximum pressure which can be established will be well below the safety value for the system. Commonly a spring loaded safety valve, indicated at 72 in Fig. 1, is arranged on the discharge side of the pump 35 and may be set, for example, to spill at 1,500 pounds per square inch pressure. In such case the spring 58 should be chosen so that the range of available pressures will be below 1,500 pounds per square inch.

The constant pressure supply system described above constitutes a very convenient source for supplying hydraulic auxiliaries. For that purpose fluid may be led off to the auxiliaries (not shown) through a branch line 36A connected to the conduit 36 at the discharge side of the pump 35. In establishing pressures for use in such an auxiliary line the hitch links 20 may conveniently be blocked against rise (or at least against complete rise) by some convenient means, such as a strut (not shown) connected from them to a pin at 50 on the differential housing or in some other suitable manner. With the hitch links thus blocked against complete rise, the maximum fluid pressure available in the system will be determined by the quadrant lever setting, the value selected being one appropriate for the particular auxiliary device which is to be operated. It is to be observed, by way of contrast, that if an attempt were made in a constant draft system to supply fluid to auxiliaries through a connection like 36A, and with the draft links blocked against full rise, that as soon as the auxiliary line was closed or the auxiliary piston went solid against the end of its cylinder that the pressure in the system would quickly rise to that required to blow the safety valve and thereafter fluid would continue to spill over the safety valve. Such safety valves, not being intended for any such service, are quickly damaged when subjected to more or less continuous spilling and pounding, not to mention the undesirable heating of oil and waste of power which is an unavoidable companion of continuous safety valve operation.

Upon analysis of the system herein disclosed, it will be evident that the operator may on occasion shift the quadrant lever 25 to a pressure setting which exceeds any load that is available for application to the hitch links 20. There may, for example, be no implement at all attached to them. No difficulty ensues, however, in such contingency. All that happens is that when the quadrant lever 25 is shifted to such position the pump 35 starts pumping fluid into the system, elevation of the draft links 20 takes place and continues until they have completed their full range of travel. At the end of such range of travel the skirt of the main ram piston 28 emerges from the end of the cylinder 27 and contacts projections 51 on the floating lever 43. The floating lever is thereupon rocked counterclockwise about the pivot 47, pulling the valve plunger 39 rightward to block the supply ports 41 and pushing such plunger into neutral.

From the foregoing it will be perceived that a safe, simple and reliable arrangement has been provided for transferring to a tractor any desired amount of load from an attached implement or the like.

I claim as my invention:

1. A controllable load transfer hitch for a tractor comprising, in combination, a hitch linkage trailingly mounted on the rear end portion of the tractor for generally vertical swinging movement, a pump powered from the tractor engine and having an intake and a discharge, a drain connection leading from the pump discharge, a valve mechanism shiftable from a neutral position in which both said pump intake and said drain connection are blocked into alternatively available exhaust and supply positions in which said drain connection and intake are respectively individually opened with the other remaining blocked, a pressure responsive unit, conduit means connecting said unit in open communication with the fluid pressure supplied to said actuator whereby said unit is subjected to the fluid pressure prevailing in said actuator, said unit including an element fixed with respect to the tractor and a shiftable element displaceable relative to said fixed element proportionately with changes in such pressure, a mechanical operating connection from said shiftable element to said valve mechanism, and a manual adjusting means for selectively varying the effective length of said operating connection.

2. A controllable load transfer hitch for a tractor comprising, in combination, a hitch linkage trailingly mounted on the rear end portion of the tractor for generally vertical swinging movement, a fluid actuator operatively connected to said hitch linkage for raising the same, a pump powered from the tractor engine for supplying pressure fluid to said actuator, a valve mechanism having alternatively available supply and exhaust positions for effecting, respectively, the supply of additional fluid from said pump to said actuator and the exhaust of fluid from said actuator, a pressure responsive device including a cylinder having a piston slidable therein, means rigidly anchoring said cylinder to the tractor body, means connecting said device in common with the fluid pressure supplied to said actuator whereby said device is subjected to the fluid pressure prevailing in said actuator, a spring for yieldably resisting the displacement of said piston under the influence of such pressure, and a mechanical operating connection from said piston to said valve mechanism.

3. A controllable load transfer hitch for a tractor comprising, in combination, a hitch linkage trailingly mounted on the rear end portion of the tractor for generally vertical swinging movement, a fluid actuator operatively connected to said hitch linkage for raising the same, a pump powered from the tractor engine for supplying pressure fluid to said actuator, valve mechanism having alternatively available supply and exhaust positions for effecting, respectively, the supply of additional fluid from said pump to said actuator and the exhaust of fluid from said actuator, a pressure responsive device, conduit means connecting said device in open communication with the fluid pressure supplied to said actuator whereby said device is subjected to the fluid pressure prevailing in said actuator, said device including an element fixed with respect to the tractor body and a shiftable element displaceable relative to said fixed element through a fixed path of travel proportionately with changes in such pressure, a floating lever, a connecting link pivotally connected at one end to an intermediate point on said floating lever and at the other to said shiftable element of said pressure responsive device, a connection from one end portion of said floating lever to said valve mechanism, and a manually positionable fulcrum for the other end portion of said lever for varying the effective length of the connection thus established between said shiftable element and said valve mechanism.

4. A controllable load transfer hitch for a tractor comprising, in combination, a hitch linkage trailingly mounted on the rear end portion of the tractor for generally vertical swinging movement, a fluid actuator operatively connected to said hitch linkage for raising the same, a pump having an intake and a discharge, a drain connection leading from the pump discharge, a valve mechanism shiftable from a neutral position in which both said pump intake and said drain connection are blocked into alternatively available exhaust and supply positions in which said drain connection and intake are respectively individually opened with the other remaining blocked, a pressure responsive unit including a housing removably mounted on the tractor and having a plunger slidably mounted therein, said unit also including a fluid piston connected to said plunger to shift the same axially in one direction relative to said housing as well as a spring for resisting such shift, means connecting said unit in common with the fluid pressure supplied to said actuator whereby the fluid pressure prevailing in said actuator is applied to the piston of said unit, and a mechanical operating connection from said plunger to said value mechanism.

5. The combination of a tractor having a hitch linkage trailingly mounted thereon for generally vertical movement, a piston and cylinder type hydraulic actuator on the tractor connected to said linkage for applying a lifting force thereto, a pump powered from the tractor engine for supplying pressure fluid to said actuator, valve means shiftable in opposite directions to connect the actuator alternatively to drain or to effect the supply of pressure fluid to the actuator from said pump, a pressure responsive unit including an element fixed with respect to the tractor and an element shiftable with respect to the fixed element, conduit means connecting said unit in open communication with the fluid pressure supplied to said actuator whereby said unit is subjected to the fluid pressure prevailing in said actuator, and means providing a connection between said shiftable element of the pressure-responsive unit and said valve means whereby the unit is effective to actuate the valve so as to maintain the fluid pressure in the actuator substantially constant and thereby retain correspondingly constant the load transferred by said linkage to the tractor.

6. A controllable load transfer hitch for a tractor comprising, in combination, a hitch linkage trailingly mounted on the rear end portion of the tractor for generally vertical swinging movement, a pump powered from the tractor engine and having an intake and a discharge, a drain connection leading from the pump discharge, valve mechanism shiftable from a neutral position in which both said pump intake and said drain connection are blocked into alternatively available exhaust and supply positions in which the drain connection and intake are respectively individually opened progressively with the other remaining blocked, a pressure-responsive unit, conduit means connecting said unit in open communication with the fluid pressure supplied to said actuator whereby said unit is subjected to the pressure prevailing in said actuator, said unit including an element fixed with respect to the tractor and a shiftable element displaceable relative to said fixed element proportionately with changes in such pressure, and a mechanical operating connection from said shiftable element to said valve mechanism.

7. A controllable load transfer hitch for a tractor comprising, in combination, a hitch linkage trailingly mounted on the rear end portion of the tractor for generally vertical swinging movement, a pump powered from the tractor engine and having an intake and a discharge, a drain connection leading from the pump discharge, valve mechanism shiftable from a neutral position in which both said pump intake and said drain connection are blocked into alternatively available exhaust and supply positions in which the drain connection and intake are respectively individually opened with the other remaining blocked, a pressure-responsive unit, conduit means connecting said unit in open communication with the fluid pressure supplied to said actuator whereby said unit is subjected to the pressure prevailing in said actuator, said unit including an element fixed with respect to the tractor and a shiftable element displaceable relative to said fixed element proportionately with changes in such pressure, a mechanical operating connection from said shiftable element to said valve mechanism, and adjusting means manually operable for variably determining the position within the range of movement of said shiftable member at which the valve mechanism is disposed in neutral position.

8. A controllable load transfer hitch for a tractor comprising, in combination, a hitch linkage trailingly mounted on the rear end portion of the tractor for generally vertical swinging movement, a pressure fluid operated actuator operatively connected to said hitch linkage for raising the same, a pump powered from the tractor engine for supplying pressure fluid to said actuator, a valve mechanism having alternatively available supply and exhaust positions for effecting, respectively, the supply of additional fluid from said pump to said actuator and the exhaust of fluid from said actuator, a pressure responsive device, conduit means connecting said device in common with the fluid pressure supplied to said actuator whereby said device is subjected to the fluid pressure prevailing in said actuator, said device including an element fixed with respect to the tractor and a shiftable element displaceable relative to said fixed element through a fixed path of travel proportionately with changes in such pressure, a floating lever, a connecting link pivotally connected at one end to an intermediate point on said floating lever and at the other to the shiftable element of said pressure-responsive device, a connection from one end of said floating lever to said valve mechanism, and a manually positionable fulcrum for the other end portion of said lever.

9. A conversion unit for a tractor having a hydraulically operated lift supplied with fluid under pressure by a pump powered from the tractor engine and under control of a valve mechanism having alternatively available supply and exhaust positions for effecting respectively the supply of additional fluid from the pump to the lift and the exhaust of fluid from the lift, said conversion unit comprising, in combination, a housing adapted to be rigidly secured on the rear portion of the tractor, a plunger axially slidable in said housing and connectable with said valve mechanism, a biasing spring urging said plunger axially forward, said housing having a cylinder therein for pressure fluid, a piston slidably received in said cylinder and operatively connected to said plunger, and conduit means for connecting said cylinder to receive pressure fluid from the pump at the pressure prevailing in the hydraulic lift of the tractor and on a side of said piston effective to urge said plunger rearwardly against the stress of said biasing spring.

10. A conversion unit for converting a constant draft hydraulic system to a constant load transfer system in a tractor having a main lift fluid actuator supplied with pressure fluid by a pump powered from the tractor engine and under control of a valve mechanism having alternatively available supply and exhaust positions, said conversion unit comprising, in combination, a housing adapted for mounting on the rear portion of the tractor, a plunger axially slidable in said housing and connectable with the valve mechanism, a biasing spring urging said plunger axially forward, said housing having a pair of cylinders therein arranged in parallelism on substantially opposite sides of said plunger, a crosshead on said plunger, pistons slidably received in respective ones of said cylinders and arranged with their rear ends abutting said crosshead, and means for connecting said cylinders to receive pressure fluid from the pump at the pressure prevailing in the main lift actuator of the tractor to urge said plunger rearward against the stress of said biasing spring and through a distance proportional to the pressure prevailing in said main lift actuator.

ERNEST V. BUNTING.

REFERENCES CITED

The following references are of record in the file of this patent:

UNITED STATES PATENTS

| Number | Name | Date |
|---|---|---|
| 2,118,180 | Ferguson | May 24, 1938 |
| 2,256,144 | Gifford et al. | Sept. 16, 1941 |
| 2,264,560 | Albertson | Dec. 2, 1941 |
| 2,351,168 | Warne | June 13, 1944 |
| 2,455,727 | Bunting | Dec. 7, 1948 |